(12) United States Patent
Byrne et al.

(10) Patent No.: US 6,796,420 B2
(45) Date of Patent: Sep. 28, 2004

(54) SELF-STACKING CONVEYOR BELT AND METHOD

(76) Inventors: Richard K. Byrne, 1408-143rd Pl. NE., Bellevue, WA (US) 98007; Gerald J. Heber, 16108 SE. 24th St., Bellevue, WA (US) 98008

(*) Notice: Subject to any disclaimer, the term of this patent is extended or adjusted under 35 U.S.C. 154(b) by 0 days.

(21) Appl. No.: 10/278,164

(22) Filed: Oct. 21, 2002

(65) Prior Publication Data

US 2003/0075418 A1 Apr. 24, 2003

Related U.S. Application Data

(60) Provisional application No. 60/335,113, filed on Oct. 23, 2001.

(51) Int. Cl.[7] .............................................. B65G 17/10
(52) U.S. Cl. ............................................... 198/822
(58) Field of Search ................................ 198/822, 778

(56) References Cited

U.S. PATENT DOCUMENTS

| | | | | |
|---|---|---|---|---|
| 2,626,041 A | * | 1/1953 | Ipsen ...................... 198/690.2 |
| 3,938,651 A | * | 2/1976 | Alfred et al. ............... 198/778 |
| 4,078,655 A | * | 3/1978 | Roinestad .................. 198/848 |
| 4,155,444 A | * | 5/1979 | Kovats ....................... 198/822 |
| 4,542,821 A | * | 9/1985 | Livermore .................. 198/822 |
| 4,565,282 A | * | 1/1986 | Olsson et al. ............... 198/778 |
| 4,603,776 A | | 8/1986 | Olsson ....................... 198/778 |
| 4,858,750 A | * | 8/1989 | Cawley ...................... 198/778 |
| 4,941,567 A | | 7/1990 | Olsson ....................... 198/778 |
| 5,190,143 A | | 3/1993 | Froderberg et al. ......... 198/778 |
| 5,346,057 A | * | 9/1994 | Fisher et al. ................ 198/778 |
| 5,350,056 A | * | 9/1994 | Hager ........................ 198/778 |
| 5,460,260 A | * | 10/1995 | Ochs et al. ................. 198/778 |
| 5,803,232 A | | 9/1998 | Froderberg ................. 198/778 |
| 5,954,188 A | * | 9/1999 | Etherington et al. ........ 198/778 |

* cited by examiner

Primary Examiner—Richard Ridley
(74) Attorney, Agent, or Firm—Dean A. Craine

(57) ABSTRACT

An improved endless conveyor belt made of a plurality of interconnected links, each including two rods with two side plates perpendicularly aligned and attached to their opposite ends. The improvement comprising the addition of an internal buttress-type welded joint located between the inside surface of each side plate and one or both transverse rods with at least one bendable section. During use, the transverse rod is allowed to bend so that the side plates may deflect when force is exerted on them. By adding the welded joint and by adding the bendable section to the transverse rod, the number of cracks or breaks in the conveyor belt is substantially reduced.

11 Claims, 5 Drawing Sheets

SELF-STACKING CONVEYOR BELT AND METHOD

This Utility Patent Application claims the benefit of Provisional Patent Application Serial No. 60/335,113, filed on Oct. 23, 2001.

BACKGROUND OF THE INVENTION

1. Field of the Invention

The invention pertains to conveyor belts commonly used for the freezing and cooking of foods and other processing applications, and more precisely to improvements that make such belts more resistant to fatigue cracks.

2. Description of the Related Art

Endless, self-stacking conveyor belts used in the freezing and cooking food industries are described in U.S. Pat. Nos. 4,603,776, 4,941,567, 5,190,143 and 5,803,232. Such conveyor belts comprise a plurality of interconnected links, each including two transverse rods and a pair of upward extending side plates. The two transverse rods are parallel and horizontally aligned and extend through holes formed near the lower edge of each side plate. Formed on one-half of the each plate is a laterally extending foot over which the ends of the two transverse rods extend. Formed on the other one-half of each side plate is an elongated slot through which one of the transverse rods from an adjacent link extends. During assembly, the end of the outer transverse rod, called an edge transverse rod, is inserted through the slot formed on the side plate of an adjacent link and then extended through the hole formed on the side plate and over the top surface of the foot. During manufacturing, both transverse rods are welded to the outer surface on each side plate and welded to the top surface of each foot. A mesh made of a plurality of loop members that extend between adjacent transverse rods and the side plates to further interconnect the links and to support products on the conveyor belt.

During use, adjacent links are loosely interconnected so that the conveyor belt may travel endlessly in straight and helical paths. It is well known that during use, fatigue cracks develop in the welded joints between the side plates and the transverse rods. When cracks are detected or when the conveyor belt breaks, the entire machinery must be taken off line at a substantial cost to the operator.

Research by the inventors have shown that the fatigue cracks are caused by the inwardly directed, radial forces exerted by the stacked upper tiers on the lower tiers on the conveyor belt when the belt is traveling in a helical path. During operation, the conveyor belt is under tension as it enters the helical path of the spiral. The tension creates radial forces that travel through each rod, stretching the belt and increasing its pitch. These radial forces are not dissipated until the diameter of the conveyor belt is sufficiently decreased. In order to accommodate the decrease in pitch on the upper tiers, the side plates on the lower tiers are bent inwardly which stresses the welded joints. Eventually, the fatigue limits of the welded joints and adjacent areas are reached and cracks are formed.

The problem of fatigue cracks and breakage of the welded joints between the side plates and transverse rods on these endless conveyor belts are well known in the industry. Attempts to address the problem have included making the transverse rods larger and out of heavy, stiffer material. Unfortunately, these changes increases the overall weight of the conveyor belt which places higher loads on the drive and support system and limit the amount of product that can be carried. Heretofore, the formation of fatigue cracks has not been alleviated.

SUMMARY OF THE INVENTION

It is the main object of the present invention to provide an improved endless conveyor belt less susceptible to developing fatigue cracks without significantly increasing the overall weight of the conveyor belt.

It is another object of the present invention to provide a method for easily modifying existing endless conveyor belts to reduce fatigue cracks.

The invention is an improved self-stacking conveyor belt that includes a plurality of interconnected links, each containing at least two transverse rods and two side plates fixed to the opposite ends of the transverse rods. Wire mesh material is disposed between the two side plates around the transverse rods and used to support material or product for air treatment. The side plates are rigidly fixed to the two transverse rods via three welded joints: a foot welded joint that attaches each transverse rod to the foot; an outside buttress-type welded joint that attaches each transverse rod to the outside surface of the side plate; and an internal buttress-type welded joint that attaches each transverse rod to the inside surface of the side plate. Heretofore, only the outside buttress-type welded joint and the foot welded joint have been used and thought to be sufficient.

The improved conveyor belt also includes each transverse rod having at least one bendable section that enables the transverse rod to bend when radial forces are exerted on the top edge of one or both side plates. The addition of an internal buttress-type welded joint between each side plate and at least one of the transverse rod not only strengthens the interconnection of the side plate to the transverse rod but also transfers the stress to the bendable sections on the transverse rods to accommodate deflection of one or both side plates. Both features eliminate fatigue cracks and greatly extend the lifespan of the conveyor belt.

Also disclosed herein is a method of strengthening an existing endless conveyor belt.

DESCRIPTION OF THE PREFERRED EMBODIMENT(S)

Figure 1:
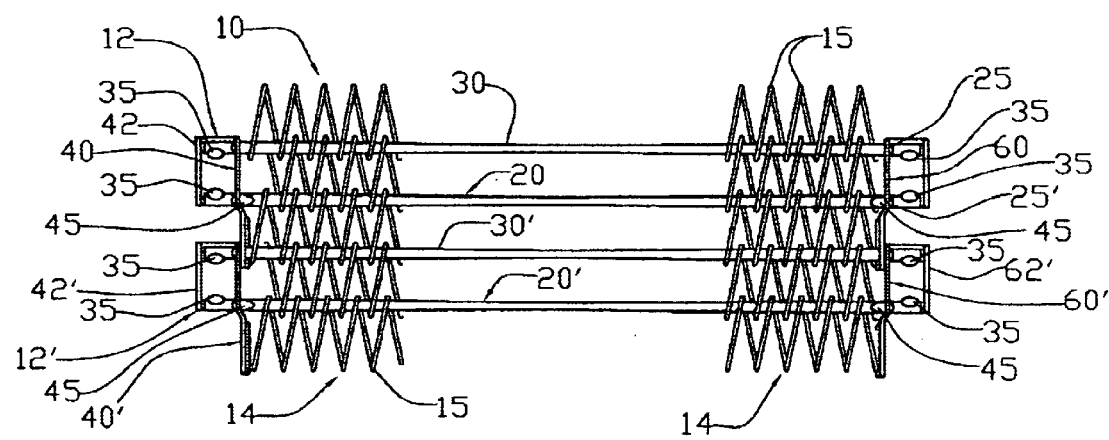
FIG. 1 is a top plan view of the improved endless conveyor belt disclosed with two side plates and two transverse rods with internal buttress-type welded joint located between the adjoining edges of the side plates and at least one transverse rod and a centrally located bendable section formed on each transverse rod.

There is shown in FIG. 1 an improved endless self-stacking conveyor belt 10, similar to the conveyor belts disclosed in U.S. Pat. Nos. 4,603,776, 4,941,567 5,190,143 and 5,803,232 and incorporated by reference herein. The conveyor belt 10 includes a plurality of transversely aligned interlocked links, 12, 12'. Each link 12, 12' includes two traverse rods 20, 30, 20', 30' and two vertically aligned side plates 40, 40', 60, 60 ' rigidly connected to the opposite ends of the two transverse rods 20, 30, 20', 30', respectively. A flexible mesh 14 made of a plurality of small loop structures 15 that individually wrap around adjacent transverse rods 20, 30 is disposed between the side plates 40, 40', 60, 60 ' and used support products on the conveyor belt 10. The conveyor belt 10 disclosed herein is specifically designed to overcome the development of fatigue cracks between transverse rods 20, 30 and the two side plates 40, 60 on each link 12, 12' caused by repeated cyclical stress on them.

Figure 2:
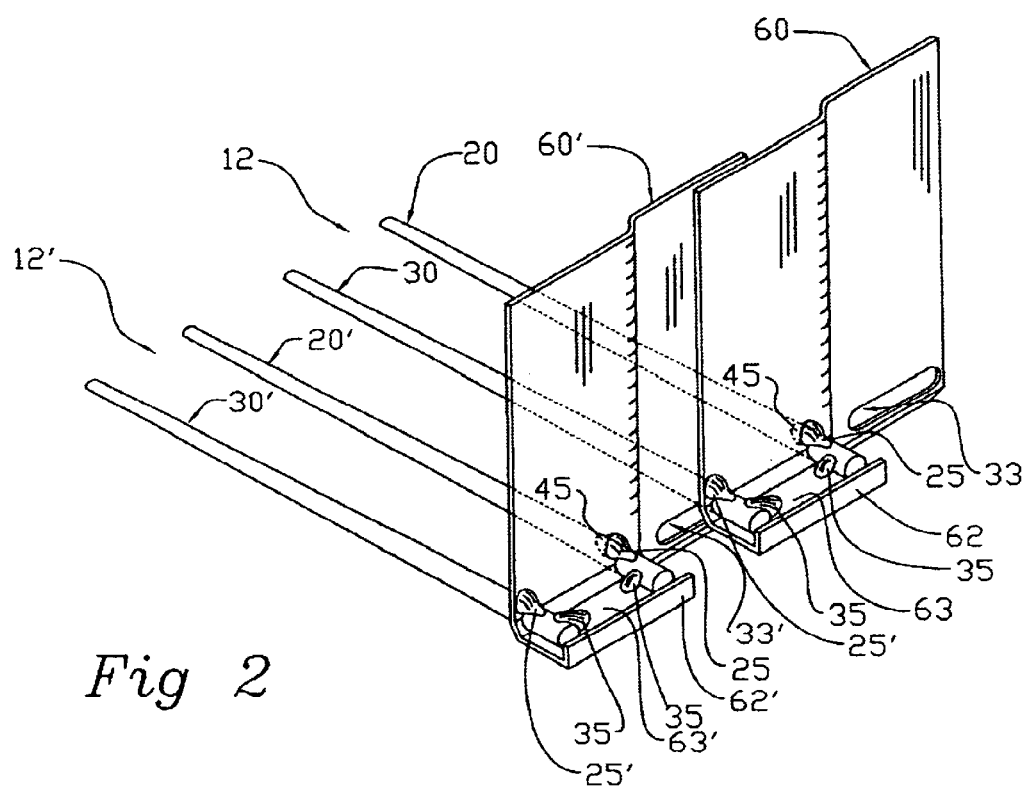
FIG. 2 is a perspective view of the side plates on two interlocking links found in the prior art.

FIG. 2 is a partial perspective view of the conveyor belt 10 showing two adjacent, interconnected links 12, 12' (minus the mesh 14). The side plates (only two side plates shown 60, 60') are Z-shaped and designed to partially overlap so that conveyor belt 10 may twist and turn during operation. Formed on the inner one-half of the side plate 60, 60' is a horizontal slot 33, 33', respectively, designed to receive the end of the outer transverse rod 30, 30' (hereinafter called the edge transverse rod 30, 30') on the adjacent link, as shown in FIG. 1. On each link, 12, 12', the ends of the center and edge transverse rods 20, 20', 30, 30' extend through the side plates 40, 40', 60, 60' and over a laterally extending foot 42, 42', 62, 62' formed on the non-slotted half of the side plate 40, 60, respectively.

As shown more clearly in FIG. 2, the ends of the edge and center transverse rods 20, 20', 30, 30' are attached to the outside surface of the side plate 60, 60' and to the top surface 63, 63' of the foot 62, 62' with buttress-type welded joints 25, 25', and one foot welded joint 35, respectively.

As shown more clearly in FIG. 2, the ends of the edge and center transverse rods 20, 20', 30, 30' are attached to the outside surface of the side plate 60, 60' and to the top surface 63, 63' of the foot 62, 62' with two buttress-type welded joints 25, 25', and one foot welded joint 35, respectively. In the preferred embodiment, no weld is made between the inside surface of the side plates 40, 60 and the edge transverse rod 30 because the edge traverse rod 30 extends through the slot 33 formed on the adjacent side plate thereby blocking access to the surfaces for welding. It should be understood that new processes may be developed that would allow a weld to be made between the inside surface of the side plate 40, 60 and the edge transverse rod 30.

The improved conveyor belt 10 includes the additional third buttress-type welded joint 45 located between the center transverse rod 20 and the inside surface of the side plates 40, 60 and at least one bendable section 70 formed on each transverse rod 20, 30 to improve the fatigue resistance of the conveyor belt 10.

Figure 3:
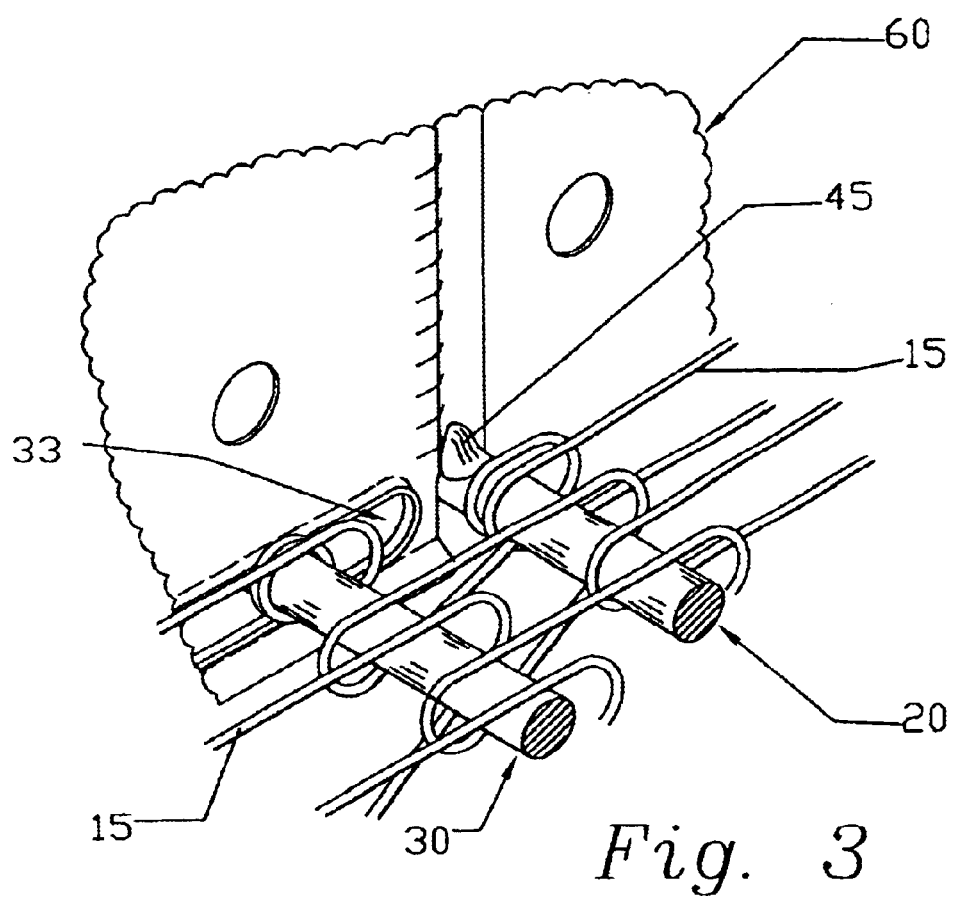
FIG. 3 is a perspective view of the inside surface of a side plate showing an additional buttress-type welded joint between the transverse rod and the side plate.

As discussed above, stresses exerted on the side plates 40, 60 during use cause cracks or breaks in the welded joints 25, 25', 35. Experiments by the inventors have shown that the addition of a third buttress-type welded joint 45 located between the inside surfaces of one or both side plates 40, 60 and one or both transverse rods 20, 30, as shown in FIG. 3, greatly reduces the formation of fatigue cracks and breakage.

The third buttress-type welded joint 45can be done with a variety of welding methods. One method is to use a tungsten inert gas welding with a shielding gas opposite the side of the buttress-type welded joint 45. The effect that the third welded joint 45 had on cracking and breakage was discovered while performing fatigue tests on a wide variety of welds. The buttress-type welded joint 45 can be used to all of the surfaces of the side plates 40, 60 to every rod 20, 30 or to one rod 20 or 30 junctions. In the preferred embodiment, shown in FIGS. 2–3, a third buttress-type welded joint 45 is used only on the central transverse rod 20 and the inside surface of the side plates 40, 60.

Figure 4:
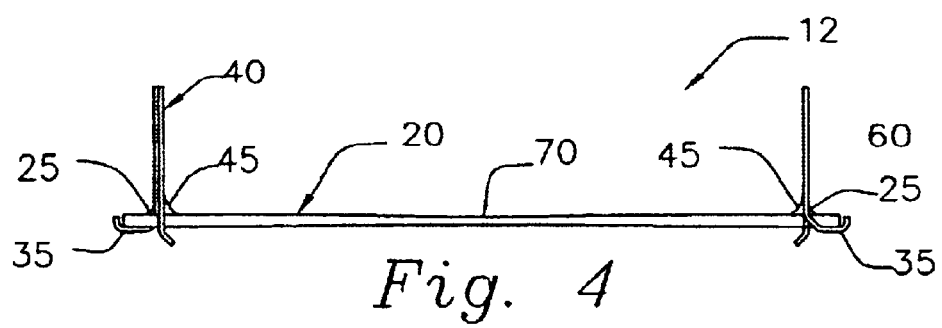
FIG. 4 is a side elevational view of the improved conveyor belt shown in FIG. 1.
Figure 5:
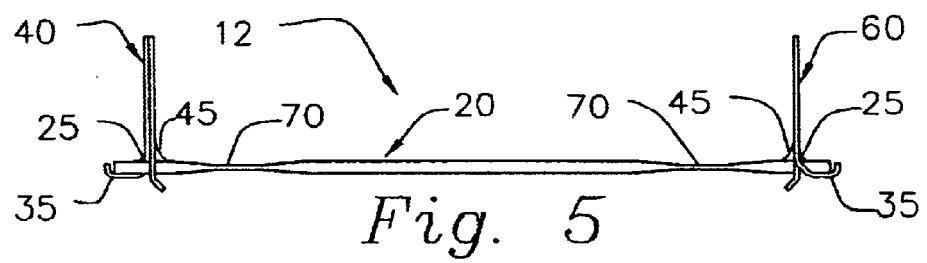
FIG. 5 is a side elevational view of the improved conveyor belt with two bendable sections located between the center axis and the side plates with internal buttress-type welded joints on between each side plate and the transverse rod.
Figure 6:
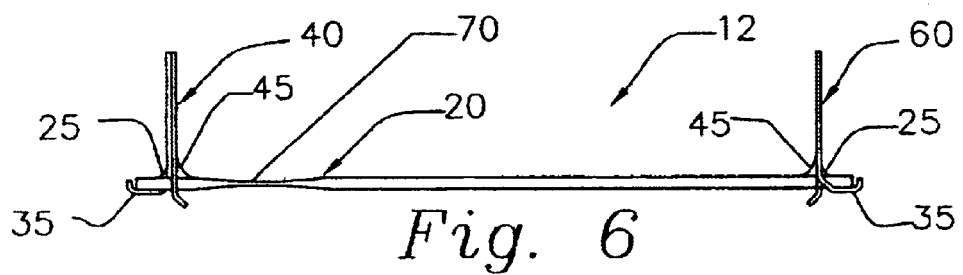
FIG. 6 is a side elevational view of the improved conveyor belt with one bendable section located adjacent to one side plate and an internal buttress type of welded joint located between each side plate and the transverse rod.
Figure 7:
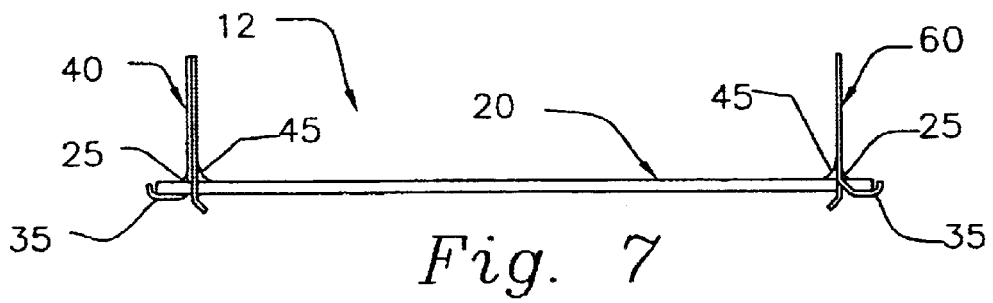
FIG. 7 is a side elevational view of the improved conveyor belt with no bendable sections on the transverse rod and internal buttress-type welded joints located between each side plate an the transverse rod.
Figure 8:
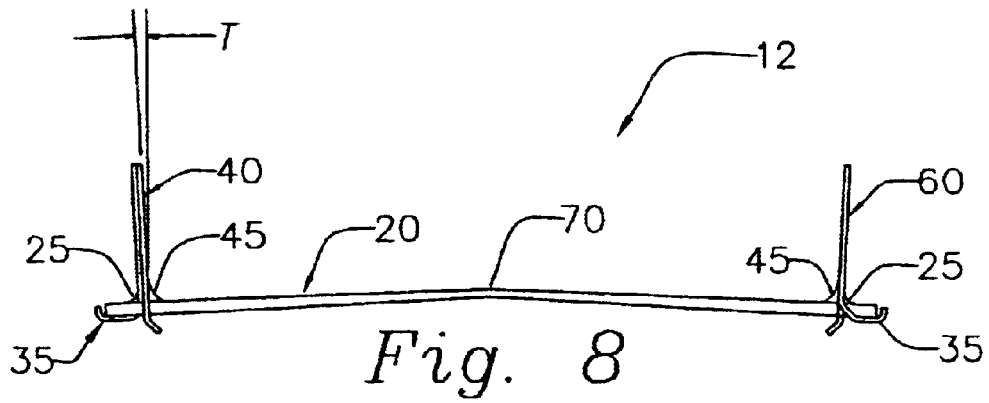
FIGS. 8, 9, and 10 show the end views of the improved conveyor belt showing the transverse rods bending in the bendable sections to accommodate deflection of the side plates.
Figure 9:
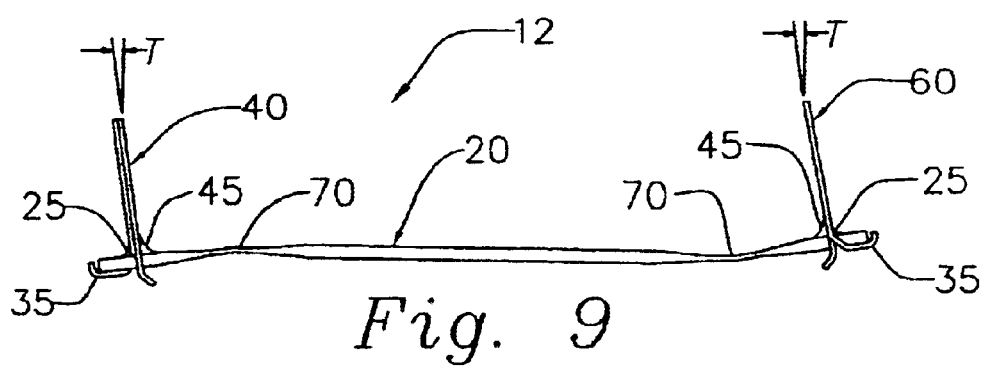
Figure 10:
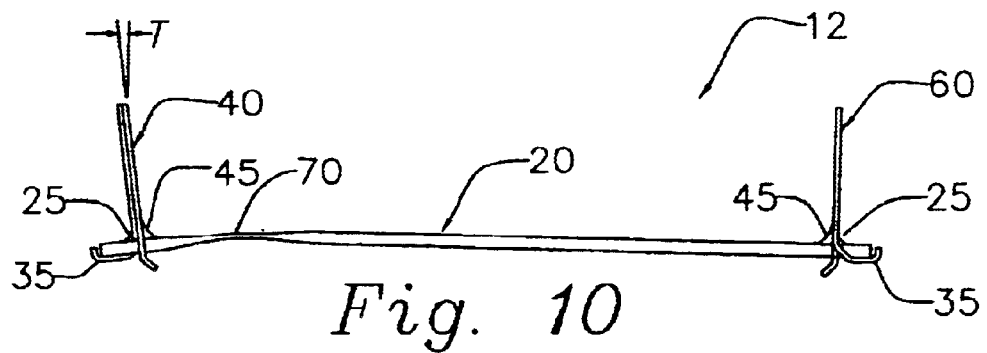

As shown in FIGS. 4–10, there are three locations where the bendable section 70 may be located on one or both of the transverse rods (traverse rod 20 shown only). FIGS. 4 and 8 show one bendable section 70 located on the middle axis of the transverse rod 20. FIGS. 6 and 10 show one bendable section 70 located adjacent to one side plate (side plate 40 shown). FIGS. 5 and 9 show two bendable sections 70, 70' located adjacent to both two side plates 40, 60. On each transverse rod 20, 30, the bendable sections 70, 70' allow the transverse rod 20, 30 to bend so that the side plates 40, 60 maybe deflected by lateral forces exerted thereon during use. In the preferred embodiment, the bendable sections 70, 70' are created by flattening the opposite surfaces of the transverse rods, 20, 30 or by reducing their diameter. In both situations, the bendable sections 70 are sufficient so that the side plates 40, 60 may be deflected approximately 0.10 inches.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. An improved endless conveyor belt having a plurality of interconnected links each including a pair of transverse rods with two perpendicularly aligned side plates, wherein the improvements comprise a buttress-type welded joint located between the inside surface of each side plate and the outer surface of at least one transverse rod and at least one bendable section formed on at least one of said transverse rods to enable at least one of the said side plates to be deflected.

2. The improved endless conveyor belt, as recited in claim 1, wherein said bendable section is located at the central axis of said transverse rod.

3. The improved endless conveyor belt, as recited in claim 1, wherein said bendable section is located between said side plate and the central axis of said transverse rod.

4. The improved endless conveyor belt, as recited in claim 2, wherein said bendable section is sufficient to enable said side plate to deflect up to 0.10 inches.

5. The improved endless conveyor belt, as recited in claim 1, wherein each said transverse rod includes bendable sections located between said side plate and the center axis of the transverse rod to allow each said side plate to deflect.

6. The improved endless conveyor belt, as recited in claim 5, wherein said bendable sections are sufficient to enable said side plates to deflect up to 0.10 inches.

7. A method of modifying an endless conveyor belt having a plurality of interconnected links, each link including a pair of transverse rods with two perpendicularly aligned side plates attached to their opposite ends, each said side plate included a laterally extending foot, each side plate being connected to each said transverse rod by one welded joint located between the outside surface of said side plate and said transverse rod and a welded joint located between said foot and said transverse rod, said method including the following steps:

a. selecting a link on the conveyor belt;
   b. manufacturing a welded joint between the inside surface of each side plate and said transverse rod; and,
   c. forming at least one bendable section on one of said transverse rods to enabling said transverse rod to bend when a deflecting force is exerted on said side plate.

8. The method as recited in claim 7, wherein said bendable section is located at the center axis of said transverse rod.

9. The method as recited in claim 7, wherein said bendable section is located between said side plate and the center axis of said transverse rod.

10. The method as recited in claim 7, said bendable section being formed on both of said transverse rods.

11. An improved link, for an endless conveyor belt made up of interconnected links that support a mesh used to carry product, said improved link including:

a. two parallel transverse rods, each said transverse rod including at least one bendable section enabling said transverse rod to bend:
   b. two side plates rigidly connected to the opposite ends of said transverse rods: and,
   c. wherein said bendable sections are sufficient to enable said side plates to deflect up to 0.10 inches.

* * * * *